US008485038B2

(12) United States Patent
Sengupta et al.

(10) Patent No.: US 8,485,038 B2
(45) Date of Patent: Jul. 16, 2013

(54) SYSTEM AND METHOD FOR AUGMENTED REALITY INSPECTION AND DATA VISUALIZATION

(75) Inventors: Anandraj Sengupta, Karnataka (IN); Vinod Padmanabhan Kumar, Karnataka (IN); Shivappa Ningappa Goravar, Karnataka (IN)

(73) Assignee: General Electric Company, Schenectady, NY (US)

( * ) Notice: Subject to any disclaimer, the term of this patent is extended or adjusted under 35 U.S.C. 154(b) by 786 days.

(21) Appl. No.: 12/272,123

(22) Filed: Nov. 17, 2008

(65) Prior Publication Data
US 2009/0154293 A1 Jun. 18, 2009

(30) Foreign Application Priority Data

Dec. 18, 2007 (IN) .............................. 3014/CHE2007

(51) Int. Cl.
*G01N 29/06* (2006.01)
*G06K 9/22* (2006.01)
*G06K 9/20* (2006.01)

(52) U.S. Cl.
USPC ................................. 73/661; 73/660; 382/103

(58) Field of Classification Search
USPC ..... 73/593, 660, 661, 621, 634, 640; 382/103
See application file for complete search history.

(56) References Cited

U.S. PATENT DOCUMENTS

| 4,176,662 | A | 12/1979 | Frazer |
| 5,493,308 | A * | 2/1996 | Bingham et al. ............... 342/442 |
| 6,091,546 | A | 7/2000 | Spitzer |
| 6,349,001 | B1 | 2/2002 | Spitzer |
| 6,500,008 | B1 | 12/2002 | Ebersole et al. |
| 6,503,195 | B1 | 1/2003 | Keller et al. |
| 6,511,418 | B2 | 1/2003 | Shahidi et al. |
| 6,517,478 | B2 | 2/2003 | Khadem |
| 6,589,163 | B2 | 7/2003 | Aizawa et al. |
| 6,625,299 | B1 | 9/2003 | Meisner et al. |
| 6,809,743 | B2 | 10/2004 | Ebersole et al. |
| 6,809,744 | B2 | 10/2004 | Ebersole et al. |
| 6,867,753 | B2 | 3/2005 | Chinthammit et al. |
| 6,989,831 | B2 | 1/2006 | Ebersole et al. |
| 7,110,909 | B2 | 9/2006 | Friedrich et al. |
| 7,126,558 | B1 | 10/2006 | Dempski |

(Continued)

FOREIGN PATENT DOCUMENTS

| EP | 1157314 A1 | 11/2001 |
| GB | 2331365 A | 5/1999 |

OTHER PUBLICATIONS

Chinese Office Action for corresponding CN200810184990.3 dated Oct. 25, 2011.

*Primary Examiner* — Peter Macchiarolo
*Assistant Examiner* — Rose M Miller
(74) *Attorney, Agent, or Firm* — Global Patent Operation; Mark A. Conklin

(57) ABSTRACT

A 3D tracking system is provided. The 3D tracking system includes at least one acoustic emission sensor disposed around an object. The acoustic emission sensor is configured to identify location of a probe inserted into the object based upon time of arrival of an acoustic signature emitted from a location on or near the probe. The 3D tracking system also includes a first sensor configured to detect an elevation of the probe. The 3D tracking system further includes a second sensor configured to detect an azimuth of the probe.

24 Claims, 5 Drawing Sheets

U.S. PATENT DOCUMENTS

| | | |
|---|---|---|
| 7,127,082 B2 | 10/2006 | Neely |
| 7,162,054 B2 | 1/2007 | Meisner et al. |
| 2002/0036649 A1 | 3/2002 | Kim et al. |
| 2003/0037449 A1 | 2/2003 | Bani-Hashemi et al. |
| 2004/0131232 A1 | 7/2004 | Meisner et al. |
| 2004/0183751 A1 | 9/2004 | Dempski |
| 2004/0189675 A1 | 9/2004 | Pretlove et al. |
| 2005/0182295 A1 | 8/2005 | Soper et al. |
| 2005/0251030 A1 | 11/2005 | Azar et al. |
| 2006/0106283 A1 | 5/2006 | Wallace et al. |
| 2006/0152478 A1 | 7/2006 | Simon |
| 2006/0241792 A1 | 10/2006 | Pretlove et al. |
| 2006/0244677 A1 | 11/2006 | Dempski |
| 2006/0259041 A1 | 11/2006 | Hoffman et al. |
| 2006/0281971 A1 | 12/2006 | Sauer et al. |
| 2007/0217672 A1* | 9/2007 | Shannon et al. ............. 382/152 |
| 2007/0233185 A1* | 10/2007 | Anderson et al. ............. 606/213 |
| 2008/0146941 A1* | 6/2008 | Dala-Krishna ................ 600/466 |
| 2008/0200807 A1* | 8/2008 | Wright et al. ................. 600/443 |
| 2008/0287860 A1* | 11/2008 | Tgavalekos et al. ............ 604/22 |

* cited by examiner

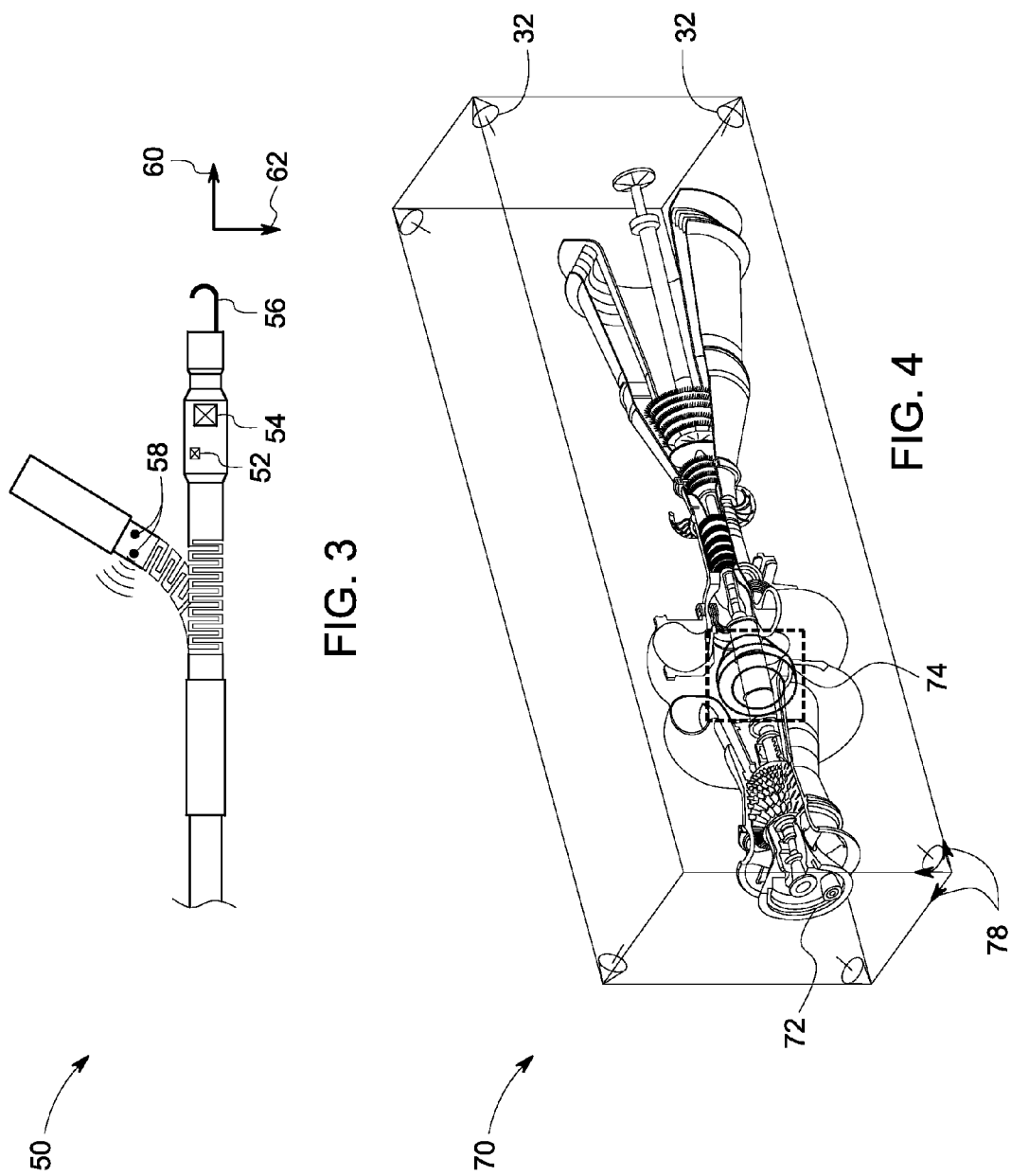

SYSTEM AND METHOD FOR AUGMENTED REALITY INSPECTION AND DATA VISUALIZATION

CROSS REFERENCE TO RELATED APPLICATIONS

This application claims the benefit of a priority under 35 USC 119 to Indian Patent Application No. 3014/CHE/2007, filed Dec. 18, 2007, entitled "SYSTEM AND METHOD FOR AUGMENTED REALITY INSPECTION AND DATA VISUALIZATION", the entire contents of which is hereby incorporated by reference.

BACKGROUND

The invention relates generally to non-destructive inspection techniques and, more particularly, to inspection techniques employing augmented reality.

Inspection techniques are commonly used in a variety of applications ranging from aircraft industry, health industry to security applications. Inspection of complex parts and structures generally require immense inspector skill and experience. Borescope inspection is one of the commonly used sources of information for monitoring of industrial infrastructure due to easy access to in-service parts and reduced downtime. Condition based maintenance strategies on gas turbine and related systems rely heavily on data obtained from such inspection. Generally, probes that use long cables with display pendants have been employed for borescope inspection. However, once the probe is inserted into a borescope inspection hole, minimal information about a location and pose of a tip of the borescope is available to an operator. Tracking the location and the pose reduces error in measurements and is very important to accurately locate flaws and damages seen. Moreover, during tip change scenarios, it is almost impossible to bring the tip to the same location.

Thus a lot of the inspection is dependant on operator skill and is subjective. Accurate information about the borescope tip and pose also enables automation and control of an entire inspection process, beginning from inspection planning to guidance to damage reporting.

Therefore, a need exists for an improved inspection system that addresses problems set forth above.

BRIEF DESCRIPTION

In accordance with an embodiment of the invention, a 3D tracking system is provided. The 3D tracking system includes at least two acoustic emission sensors disposed around an object. The acoustic emission sensors are configured to identify location of a probe inserted into the object based upon time of arrival of an acoustic signature emitted from a location on or near the probe. The 3D tracking system also includes a first sensor configured to detect an elevation of the probe. The 3D tracking system further includes a second sensor configured to detect an azimuth of the probe.

In accordance with another embodiment of the invention, an augmented reality system for inspection within an object is provided. The augmented reality system includes a tracking system configured to identify a 3D location of a probe inserted into the object. The 3D tracking system includes at least one acoustic emission sensors disposed around an object. The acoustic emission sensors are configured to identify location of a probe inserted into the object based upon time of arrival of an acoustic signature emitted from a location on or near the probe. The 3D tracking system also includes a first sensor configured to detect an elevation of the probe. The 3D tracking system further includes a second sensor configured to detect an azimuth of the probe. The augmented reality system also includes a microprocessor configured to generate graphics and superimpose the graphics on the image captured by the camera based upon the 3D location identified by the tracking system. The augmented reality system further includes a display unit configured to display an augmented reality image.

In accordance with another embodiment of the invention, a method of 3D tracking within an object is provided. The method includes inserting a probe into the object. The method also includes disposing at least one acoustic emission sensor around the object. The method further includes attaching a first sensor and a second sensor to the probe.

In accordance with another embodiment of the invention, a method for forming an augmented reality image for inspection within an object is provided. The method includes capturing an image via a camera. The method also includes identifying a location of a probe within the object via a plurality of acoustic emission sensors. The method further includes determining elevation of the probe via a first sensor. The method also includes determining azimuth of the probe via a second sensor. The method also includes generating graphics of the object. The method further includes registering the graphics on the image captured based upon the location, elevation and the azimuth determined to form an augmented reality image.

DRAWINGS

These and other features, aspects, and advantages of the present invention will become better understood when the following detailed description is read with reference to the accompanying drawings in which like characters represent like parts throughout the drawings, wherein:

FIG. 3 is a diagrammatic illustration of an exemplary borescope in accordance with an embodiment of the invention;

FIG. 4 is a schematic illustration of an augmented reality image formed for inspection of a gas turbine using the borescope in FIG. 3;

DETAILED DESCRIPTION

As discussed in detail below, embodiments of the invention include a system and method for non-destructive inspection of an object. The system and method disclosed herein generate an augmented reality image using an improved tracking system for inspection. As used herein, 'augmented reality image' refers to an image that includes real world data superimposed with computer generated data. Non-limiting examples of the object include aircraft engines, gas turbines, steam turbines, diesel engines and a living organism.

Figure 1:
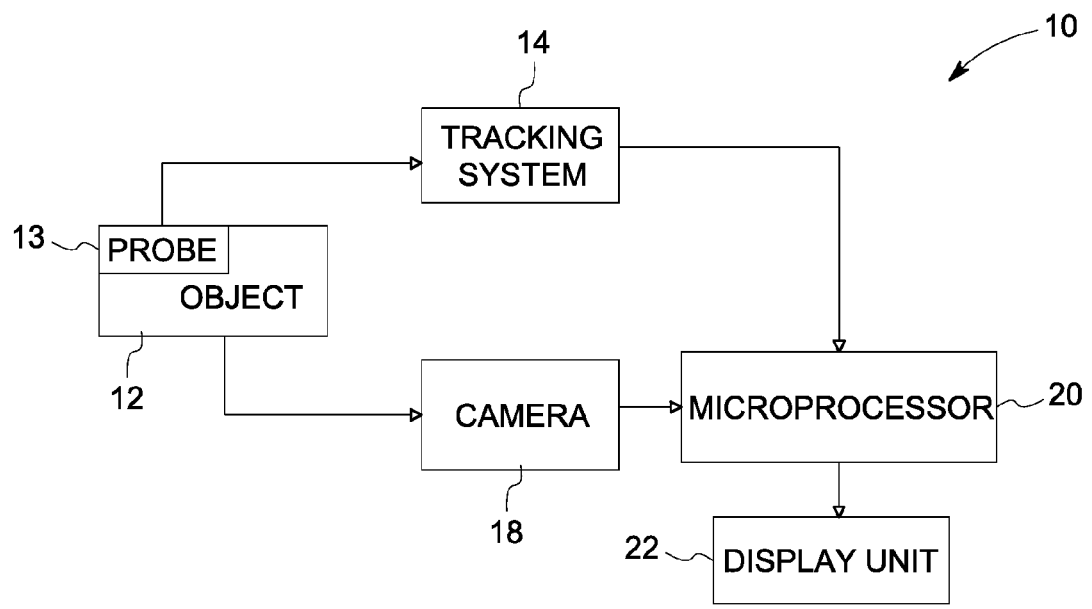
FIG. 1 is a block diagram representation of an augmented reality image system including a tracking system in accordance with an embodiment of the invention.

Turning to the drawings, FIG. 1 is a high-level block diagram representation of an augmented reality system 10 to inspect an object 12. A tracking system 14 is employed to identify a 3D location and position of a probe 13 inserted into the object 12. In a particular embodiment, the probe 13 includes a borescope or an endoscope. The camera 18 captures a view of the object 12 as a real image. In a particular embodiment, the camera 18 captures a monocular view. In another embodiment, the camera 18 captures a stereoscopic view. Non-limiting examples of the camera 18 include a web camera, a video camera, or a CCD camera. In another embodiment, more than one camera can be used, for example two cameras could be arranged so as to provide stereoscopic images. Non-limiting examples of the real image include a video image and a still image.

The real image captured is used as a reference by a microprocessor 20 that is configured to generate graphics corresponding to the real image. In an example, the graphics includes computer-aided design drawings of the object 12. The microprocessor 20 further superimposes the graphics on the real image based upon the 3D location identified by the tracking system 14 to generate an augmented reality image. Thus, the stereoscopic view obtained from the camera 18 is augmented with additional information and provided to a user in real time. The additional information may include, for example, text, audio, video, and still images. For example, in a surgical workspace, a surgeon may be provided with a view of a patient including, inter alia, the view of the patient and an overlay generated by the microprocessor 20. The overlay may include a view of the patient's internal anatomical structures as determined, for example, during a Computerized Axial Tomography (CAT) scan, or by Magnetic Resonance Imaging (MRI).

In another embodiment, the overlay includes a textual view of the patient's medical and family history. The overlays may be displayed in real-time. The augmented reality image includes the real image captured by the camera 18 overlaid with an additional virtual view. The virtual view is derived from the microprocessor 20 and stored information, for example, images. The augmented reality image also enables detection of flaws or cracks in the object 12. In an exemplary embodiment, the microprocessor 20 includes a wearable computer. The microprocessor 20 displays an augmented reality image on a display unit 22 but not limited to, a personal digital assistant (PDA), pendant, an external computer and semi-transparent goggles.

It should be noted that embodiments of the invention are not limited to any particular microprocessor for performing the processing tasks of the invention. The term "microprocessor" as that term is used herein, is intended to denote any machine capable of performing the calculations, or computations, necessary to perform the tasks of the invention. The term "microprocessor" is intended to denote any machine that is capable of accepting a structured input and of processing the input in accordance with prescribed rules to produce an output.

Figure 2:
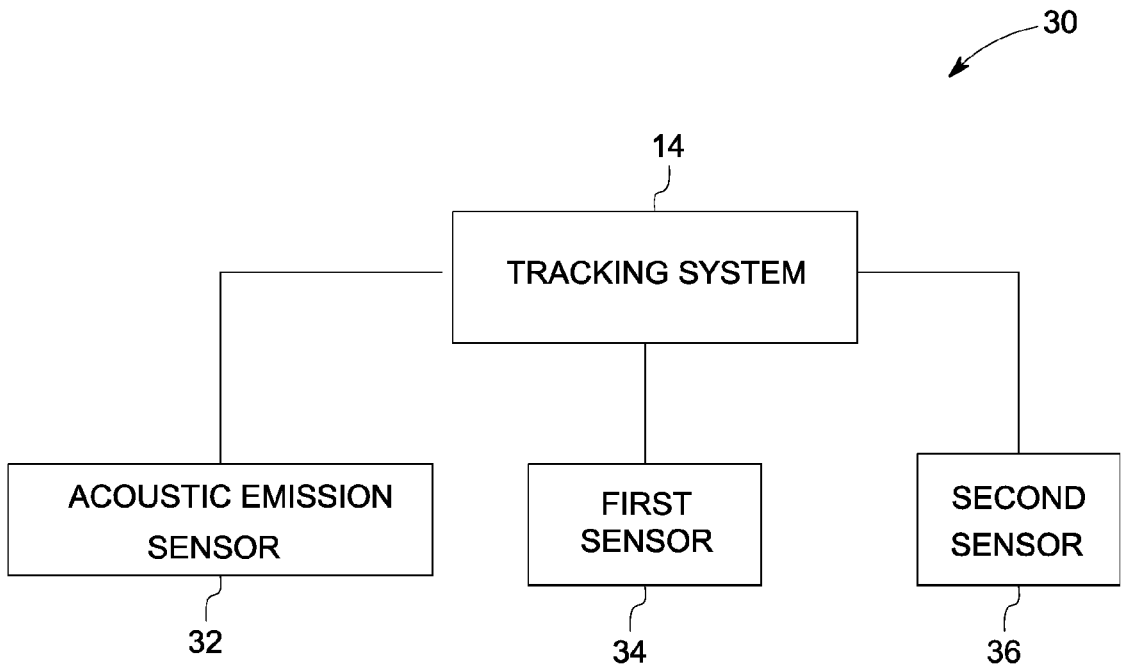
FIG. 2 is a block diagram representation of elements within the tracking system in FIG. 1.

FIG. 2 is a block diagram representation of elements 30 within the tracking system 14 in FIG. 1. The tracking system 14 includes at least one acoustic emission sensor 32 disposed around the object 12 (FIG. 1). The acoustic emission sensor 32 is configured to identify location of a probe 13 (FIG. 1) inserted into the object 12 for inspection. In a particular embodiment, the acoustic emission sensor includes a diameter in a range between about 6 millimeters (mm) and about 12 mm. The location is determined based upon calculation of a time of arrival of an acoustic signature emitted from within the object 12. In a particular embodiment, the acoustic signature is emitted via a single speaker or multiple speakers disposed at a tip of the probe 13. A first sensor 34 detects an elevation of the probe. In one embodiment, the first sensor 34 includes a gravity sensor implemented in integrated microelectrical mechanical systems (MEMS) technology and configured to detect the elevation based upon acceleration due to gravity. In another embodiment, the first sensor 34 includes a gyroscope implemented in integrated micro-electrical mechanical systems (MEMS) technology and configured to detect the elevation based upon conservation of angular momentum. In yet another embodiment, output of the first sensor 34 is integrated over time to determine a position of the tip of the probe 13. In a non-limiting example, the acceleration is integrated twice over time to determine the position.

The tracking system 14 further includes a second sensor 36 configured to detect an azimuth of the probe 13. In an exemplary embodiment, the second sensor 36 includes a magnetic sensor such as, but not limited to, a magnetic compass, configured to detect the azimuth in presence of a magnetic field. In an example, a solenoid is employed to apply a magnetic field to the magnetic sensor. In yet another embodiment, the second sensor 36 is a gyroscope that detects angular rotation rate along three orthogonal axes. In yet another embodiment, output of the second sensor 36 is integrated over time to determine a position of the tip of the probe 13. In a non-limiting example, the acceleration is integrated twice over time to determine the position.

FIG. 3 is a schematic illustration of an exemplary probe 13 (FIG. 1) such as a borescope 50 employed for inspection of an object such as, but not limited to, a gas turbine. The borescope 50 includes a first sensor 52 and a second sensor 54 disposed near a tip 56 of the borescope 50. Multiple 'tiny' speakers 58 are also disposed near the tip 56. It will be appreciated that although multiple speakers 58 have been illustrated in FIG. 3, a single speaker may also be employed. The speakers 58 emit acoustic signals at various locations within the object that are captured by the acoustic emission sensor 32 (FIG. 2). In the illustrated embodiment, the first sensor 52 is a MEMS gravity sensor. The MEMS gravity sensor 52 measures acceleration/gravity along a sensitive axis having direction 60. In one embodiment, when the borescope 50 is aligned vertically downward towards the earth in a direction 62, the sensitive axis 60 points vertically downward, resulting in a value of acceleration/gravity equal to 1. In another embodiment, when the borescope 50 is tilted with respect to the vertical, the sensitive axis of the MEMS gravity sensor 52, along which the acceleration/gravity is measured, is tilted with respect to the vertical, and the MEMS gravity sensor 52 measures a value of acceleration/gravity less than 1. Accordingly, output of the MEMS gravity sensor detects an elevation of the borescope 50. In a particular embodiment, the MEMS gravity sensor includes a diameter in a range between about 1 to about 4 mm. The second sensor 54 may be an angular rate gyroscope implemented in integrated MEMS technology. The gyroscope senses a change in rotation of the borescope 50 and accordingly detects an azimuth of the borescope 50. In one embodiment, the second sensor 54 includes a diameter in a range between about 2 to about 8 mm.

FIG. 4 is a schematic illustration of an augmented reality image 70 including real world data as in a gas turbine 72 and computer generated data as in blades 74 interior to the gas turbine 72. The augmented reality image 70 is obtained by superimposing graphics generated of the blades 74 on an image of the gas turbine including a casing captured by the camera 18 (FIG. 1). In a particular embodiment, the image includes a 2D image. The microprocessor 20 (FIG. 1) stores and registers information from the image of the gas turbine captured and generates graphics based upon the 3D location obtained from the tracking system 14 (FIG. 1). The microprocessor 20 contains necessary software in order to generate a graphical representation and an augmented reality image based upon the image from the camera 18 and the generated graphical representation. Further, the microprocessor 20 contains a storage medium in order to save and restore previously saved information.

In order to overlay an image, position and orientation of the camera 18 with respect to the gas turbine 72, and the orientation of the gas turbine, need to be determined. As a result, it is desirable to know the relationship between two coordinate systems, a camera coordinate system (not shown) attached to the camera 18, and a coordinate system 78 attached to the gas turbine 72. Tracking denotes the process of monitoring the relationship between the coordinate systems. The microprocessor 20 (FIG. 1) registers 3D location obtained from the tracking system 14 in a reference frame having the coordinate system 78 of the gas turbine 72.

Figure 5:
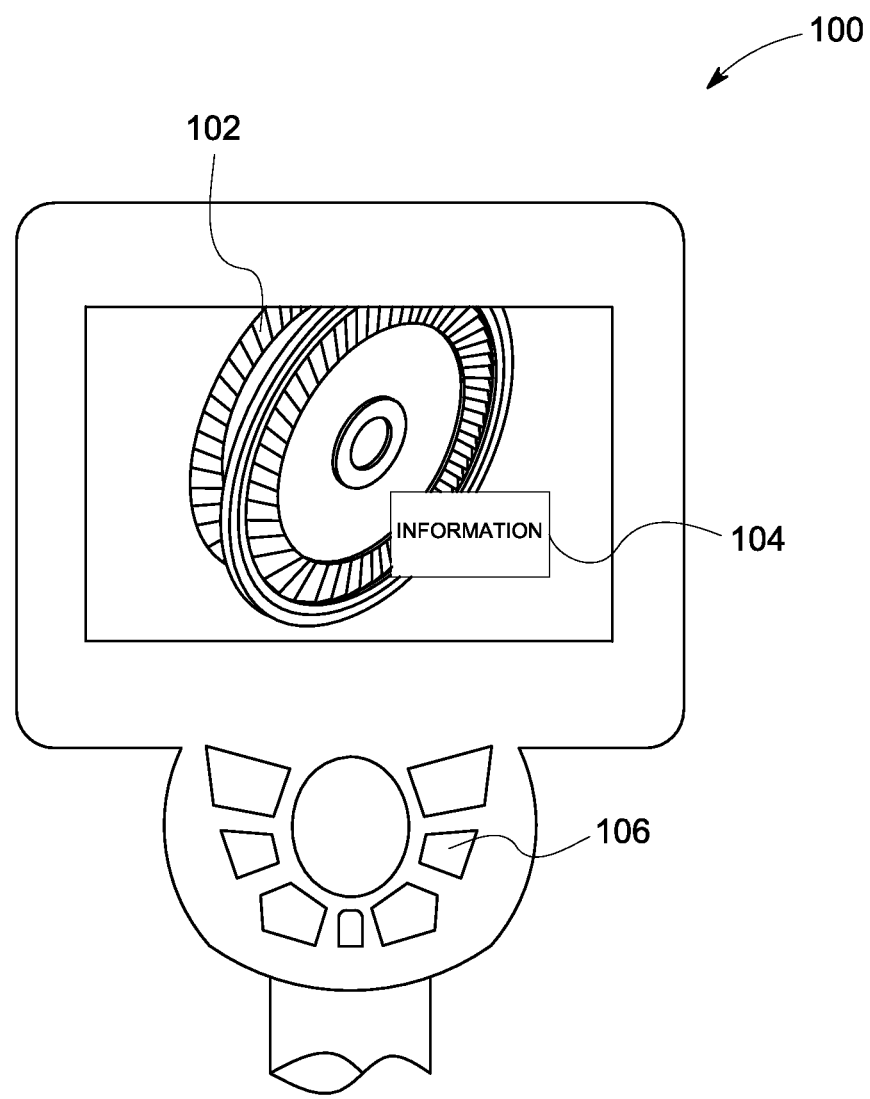
FIG. 5 is a schematic illustration of an exemplary display unit in accordance with an embodiment of the invention.

FIG. 5 is a schematic illustration of an exemplary display unit 100. The display unit 100 includes a handheld display commercially available from General Electric Inspection Technologies under the designation Everest XLG3®. The display unit 100 displays an image of blades 102 in an interior of the gas turbine 72 (FIG. 4) and superimposed with information 104 generated by the microprocessor 20. Some examples of the information include a serial number of a blade, time of operation, and identification of a crack. The display unit 100 also includes navigation buttons 106 to select and edit the display.

As illustrated, a real view and a virtual view are blended. For example, the virtual view is provided as a transparency over the real view of the gas turbine 72. Registration between the real view and the virtual view aligns the real and virtual views. Registration of the virtual view includes, inter alia, position, orientation, scale, perspective, and internal camera parameters for each camera. Preferably, the internal camera parameters such as, but not limited to, magnification are determined in a prior camera calibration procedure. The registered virtual view is aligned with the real image of the gas turbine 72 in real time. In a particular embodiment, an operator carries the display unit 100 which will provide him/her with an augmented reality view of the gas turbine 72. In an exemplary embodiment, the display unit 100 is of a "video see through" type.

"Video see-through" generates and presents an augmented reality world at a handheld display device such as display unit 100. The camera integrated with the display device is used to capture a live video stream of the real world. The camera 18 (FIG. 1) is located in relation with the display unit 100 in such a way that it provides the same view, as an user would get by looking "through" the display device. The live video stream combined with computer-generated graphics is presented in real-time at the display unit 100. Additional functionality includes camera zooming with output of the actual camera focal length. This will enable an accurate display of the computer-generated graphics correctly while zooming.

Figure 6:
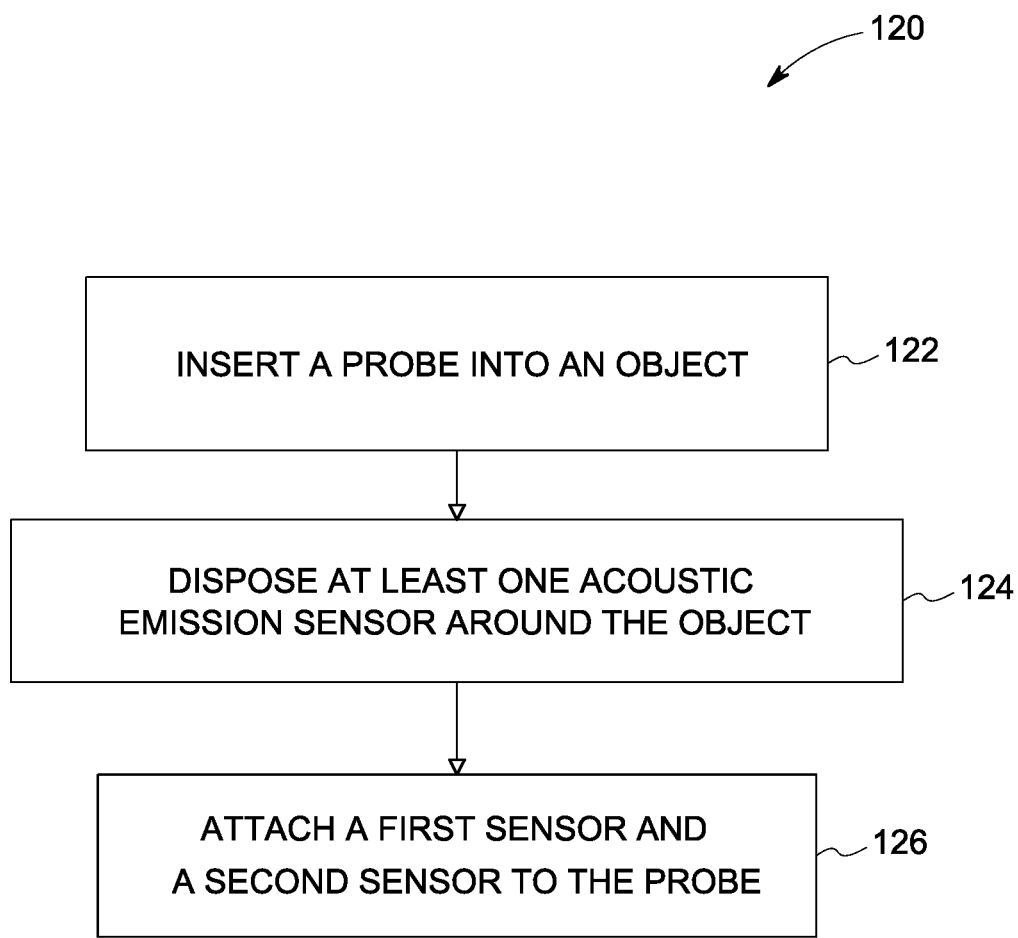
FIG. 6 is a flow chart representing steps in an exemplary method for 3D tracking within an object.

FIG. 6 is a flow chart representing steps in an exemplary method 120 for 3D tracking within an object. The method 120 includes inserting a probe into the object in step 122. One or more acoustic emission sensors are disposed around the object in step 124. A first sensor and a second sensor are further attached to the probe in step 126. In a particular embodiment, the first sensor and the second sensor are attached at a tip of the probe. In another embodiment, a single speaker or multiple speakers are disposed at the tip of the probe.

Figure 7:
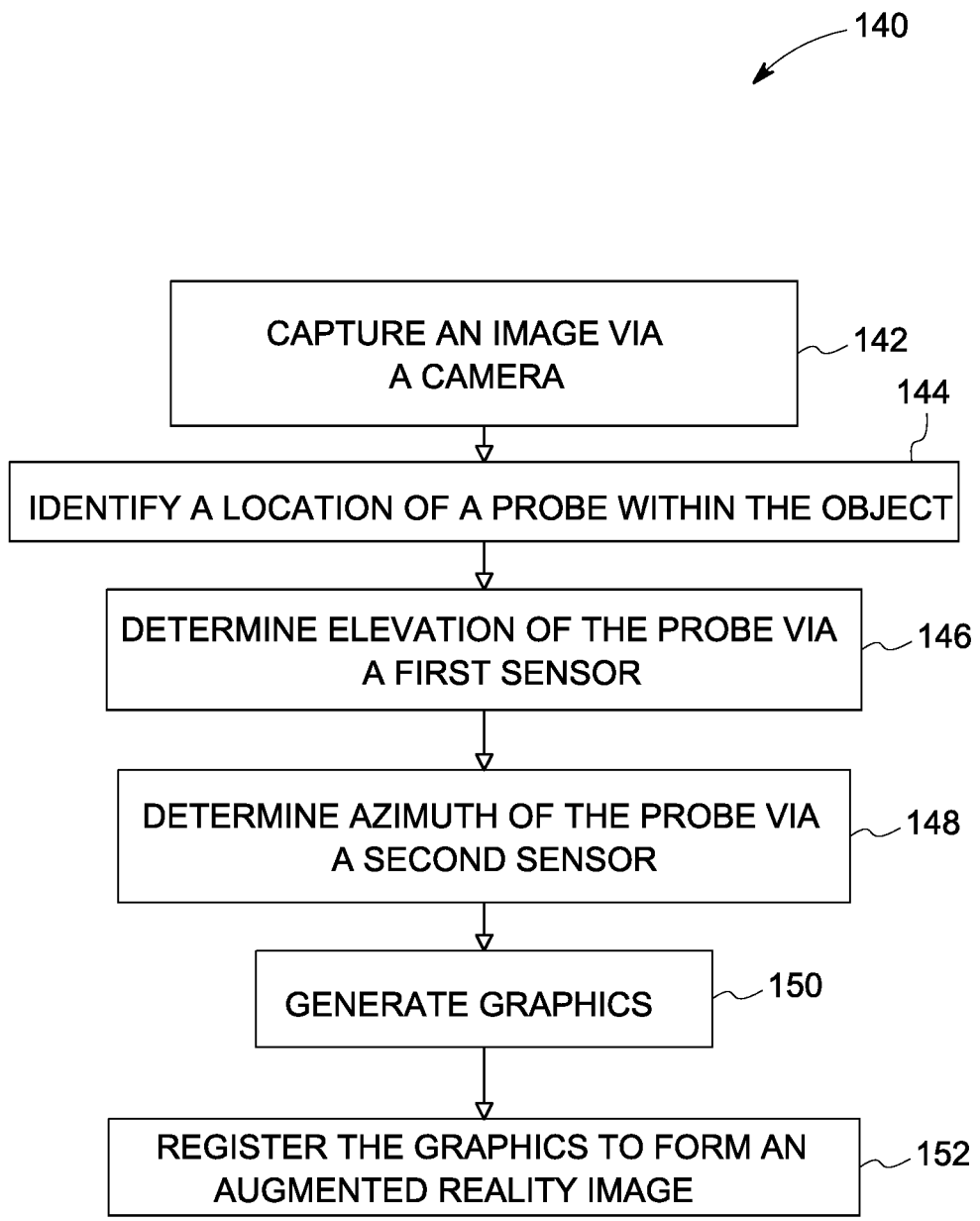
FIG. 7 is a flow chart representing steps in an exemplary method for forming an augmented reality image for inspection within an object.

FIG. 7 is a flow chart representing steps in an exemplary method 140 for forming an augmented reality image for inspection within an object. The method 140 includes capturing an image via a camera in step 142. A location of a probe within the object is identified in step 144 via one or more acoustic emission sensors. In a particular embodiment, the location is identified by calculating a time of travel of an acoustic signal emitted from the tip of the probe to the acoustic sensors. An elevation of the probe is determined via a first sensor in step 146. An azimuth of the probe is further determined via a second sensor in step 148. In an exemplary embodiment, the azimuth of the probe is determined by applying a magnetic field to the second sensor. Graphics of the object is generated in step 150. The graphics is registered on the image captured based upon the location, elevation and the azimuth determined to form an augmented reality image in step 152.

The various embodiments of an augmented reality system and method described above thus provide a way to achieve a convenient and efficient means for inspection. The system and method also provides for a guided and enhanced insitu inspection & repair and foreign debris removal. Further, it provides a lower risk of forced outage due to improved damage reporting.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of a web camera with respect to one embodiment can be adapted for use with a pendant as a display unit described with respect to another. Similarly, the various features described, as well as other known equivalents for each feature, can be mixed and matched by one of ordinary skill in this art to construct additional systems and techniques in accordance with principles of this disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A three-dimensional (3D) tracking system comprising:
   at least one acoustic emission sensor disposed around an object, said at least one acoustic emission sensor configured to identify a location of a probe inserted into the object based upon time of arrival of an acoustic signature emitted from a location on or near the probe;
   a first sensor configured to detect an elevation of the probe;
   a second sensor configured to detect an azimuth of the probe;
   an image capturing device configured to capture an image of said object; and
   a microprocessor, configured to:

receive the captured image, the identified location of the probe, the elevation and azimuth of the probe, utilize the captured image to generate a corresponding real-time graphics, and utilize the identified location, elevation and the azimuth of the probe to obtain a graphics of an object associated with said identified location, elevation and azimuth of the probe; and superimpose the obtained graphics onto the real time graphics of the object.

2. The 3D tracking system of claim 1, wherein the acoustic signature comprises an acoustic signature emitted via at least one speaker disposed at a tip of the probe.

3. The 3D tracking system of claim 1, wherein the first sensor comprises a micro-electro-mechanical systems (MEMS) gravity sensor configured to detect elevation based upon acceleration due to gravity.

4. The system of claim 3, wherein the micro-electromechanical syste (MEMS) gravity based sensor comprises a diameter in a range of 1 millimeter (mm) to 4 mm.

5. The 3D tracking system of claim 1, wherein at least one of the first sensor and the second sensor is disposed near a tip of the probe.

6. The system of claim 1, wherein the at least one acoustic emission sensors comprises a diameter in a range between 6 mm and 12 mm.

7. The system of claim 1, wherein the second sensor comprises a micro-electromechanical systems magnetic sensor configured to detect azimuth in presence of a magnetic field.

8. The system of claim 7, wherein the micro-electromechanical systems magnetic sensor comprises a diameter in a range between 2 to 8 mm.

9. The system of claim 1, the second sensor comprises one of; a magnetic compass and a gyroscope.

10. The system of claim 1, wherein the probe comprises a borescope.

11. The system of claim 1, wherein the object comprises a gas turbine.

12. An augmented reality system for inspection within an object comprising:
    a tracking system configured to identify a three-dimensional (3D) location of a probe inserted into the object, the tracking system comprising:
        at least one acoustic emission sensor disposed around the object, the acoustic emission sensor configured to identify a location of a probe inserted into the object based upon time of arrival of an acoustic signature;
        a first sensor configured to detect an elevation of the probe; and
        a second sensor configured to detect an azimuth of the probe;
    a camera configured to capture an image of the object;
    a microprocessor configured to
        receive the captured image the identified location of the probe, the elevation and azimuth of the probe,
        generate an augmented reality image by superimposing on the image captured by the camera a graphics of an object determined based upon the location identified by the tracking system; and
    a display unit configured to display said augmented reality image.

13. The augmented reality system of claim 12, wherein the display unit comprises a handheld display.

14. The augmented reality system of claim 12, wherein the display unit comprises an external computer.

15. The augmented reality system of claim 12, wherein the image captured comprises one of: a two-dimensional (2D) or a three-dimensional (3D) image.

16. The augmented reality system of claim 12, wherein the real-time graphics comprises a plurality of computer-aided design drawings of the object.

17. The augmented reality system of claim 12, wherein the probe comprises a borescope.

18. The augmented reality system of claim 12, wherein the object comprises a gas turbine.

19. A method of 3D tracking within an object comprising:
    inserting a probe into the object;
    disposing at least one acoustic emission sensor around the object; and attaching a first sensor and a second sensor to the probe said first sensor and said second sensor determining an orientation of said probe;
    determining a location of said probe based on a time of arrival of receipt of a signal detected by said at least one acoustic emission sensor;
    capturing an image of the object; and
    generating an augmented image by obtaining a graphics of an object associated with said identified location and orientation of said probe and superimposing said obtained graphics onto said captured image.

20. The method of claim 19, further comprising attaching a plurality of speakers at a tip of the probe.

21. The method of claim 20 wherein the attaching a first sensor and a second sensor to the probe comprises attaching the first sensor and the second sensor near a tip of the probe.

22. A method for forming an augmented reality image for inspection within an object comprising:
    continuously capturing a series of images in real-time of the object;
    identifying a location of a probe within the object via a plurality of acoustic emission sensors;
    determining an elevation of the probe via a first sensor;
    determining an azimuth of the probe via a second sensor;
    generating real-time graphics of the object; and
    forming an augmented reality image by registering graphics on the captured real-time image of the object and graphics of an object based upon the location, elevation and the azimuth of the probe.

23. The method of claim 22, wherein the identifying comprises calculating a time of travel of an acoustic signal emitted from a tip of the probe to the acoustic sensors.

24. The method of claim 22, wherein the determining azimuth comprises applying a magnetic field to the second sensor.

* * * * *

UNITED STATES PATENT AND TRADEMARK OFFICE
CERTIFICATE OF CORRECTION

PATENT NO. : 8,485,038 B2  
APPLICATION NO. : 12/272123  
DATED : July 16, 2013  
INVENTOR(S) : Sengupta et al.

Page 1 of 1

It is certified that error appears in the above-identified patent and that said Letters Patent is hereby corrected as shown below:

In the Claims:

In Column 6, line 67, in Claim 1, delete "microprocessor," and insert -- microprocessor --, therefor.

In Column 7, Line 19, in Claim 4, delete "syste" and insert -- systems --, therefor.

In Column 7, Line 33, in Claim 9, delete "1, the" and insert -- 1, wherein the --, therefor.

In Column 7, Line 34, in Claim 9, delete "of;" and insert -- of: --, therefor.

In Column 7, Line 53, in Claim 12, delete "to" and insert -- to: --, therefor.

In Column 7, Line 54, in Claim 12, delete "image" and insert -- image, --, therefor.

In Column 8, Line 23, in Claim 19, delete "probe" and insert -- probe, --, therefor.

In Column 8, Line 35, in Claim 21, delete "claim 20" and insert -- claim 20, --, therefor.

Signed and Sealed this  
Fifteenth Day of October, 2013

Teresa Stanek Rea  
*Deputy Director of the United States Patent and Trademark Office*